US012698540B2

(12) United States Patent
Ma et al.

(10) Patent No.: US 12,698,540 B2
(45) Date of Patent: Aug. 4, 2026

(54) BLAST FURNACE DISTRIBUTING DEVICE WITH NITROGEN SEALING STRUCTURE

(71) Applicant: CISDI Research & Development Co., Ltd., Chongqing (CN)

(72) Inventors: Yunfeng Ma, Chongqing (CN); Shusheng Wang, Chongqing (CN); Jun Zheng, Chongqing (CN); Wenjun Dai, Chongqing (CN)

( * ) Notice: Subject to any disclaimer, the term of this patent is extended or adjusted under 35 U.S.C. 154(b) by 0 days.

(21) Appl. No.: 18/037,562

(22) PCT Filed: Sep. 26, 2021

(86) PCT No.: PCT/CN2021/120566
§ 371 (c)(1),
(2) Date: Jun. 8, 2023

(87) PCT Pub. No.: WO2022/121448
PCT Pub. Date: Jun. 16, 2022

(65) Prior Publication Data
US 2024/0002963 A1 Jan. 4, 2024

(30) Foreign Application Priority Data

Dec. 8, 2020 (CN) ........................ 202011445810.X

(51) Int. Cl.
C21B 7/20 (2006.01)
F16J 15/34 (2006.01)
F16J 15/40 (2006.01)
F16J 15/447 (2006.01)

(52) U.S. Cl.
CPC ............. C21B 7/20 (2013.01); F16J 15/3472 (2013.01); F16J 15/40 (2013.01); F16J 15/4472 (2013.01)

(58) Field of Classification Search
CPC . C21B 7/20; F16J 15/40; F16J 15/3472; F16J 15/4472
See application file for complete search history.

(56) References Cited

U.S. PATENT DOCUMENTS

| | | | |
|---|---|---|---|
| 6,431,553 B1 | 8/2002 | Amaral et al. | |
| 2016/0134167 A1 | 5/2016 | Kawashima et al. | |

FOREIGN PATENT DOCUMENTS

| | | |
|---|---|---|
| CN | 2284792 Y | 6/1998 |
| CN | 2685347 Y | 3/2005 |
| CN | 1641049 A | 7/2005 |
| CN | 201195730 Y | 2/2009 |

(Continued)

OTHER PUBLICATIONS

CN 214142422 machine translation (Year: 2021).*

(Continued)

*Primary Examiner* — Tima M. McGuthry-Banks

(74) *Attorney, Agent, or Firm* — Michael D. Eisenberg; MDE Patents

(57) ABSTRACT

The invention relates to an improved blast furnace distributing device with a nitrogen sealing structure which belongs to the field of blast furnace. The nitrogen sealing structure is divided into two functional areas on whole structure, wherein a labyrinth structure is arranged at position close to lower side of a blast furnace, which can achieve dustproof and dust falling effects, increase gas pressure resistance loss inside a furnace, and provide favorable conditions for sealing of an upper floating ring; the floating rings which are matched with one another are arranged at position close to upper side of the distributing device can be kept in contact all time through self-adaption in operation process, and achieve tighter combination through mutual running-in, so the structure does not require high-precision manufacturing cost. By keeping upper pressure higher than blast furnace pressure, the invention can be guaranteed that the floating rings have certain sealing pressing force so as to achieve better sealing effect.

10 Claims, 4 Drawing Sheets

(56)     References Cited

FOREIGN PATENT DOCUMENTS

| CN | 202116573 | U | 1/2012 |
| CN | 202402644 | U | 8/2012 |
| CN | 202430243 | U | 9/2012 |
| CN | 202925042 | U | 5/2013 |
| CN | 204608060 | U | 9/2015 |
| CN | 106415178 | A | 2/2017 |
| CN | 111173933 | A | 5/2020 |
| CN | 214142422 | U | 9/2021 |

OTHER PUBLICATIONS

CN 113201616 A machine translation (Year: 2021).*

CN 208604150 U machine translation (Year: 2019).*

Zhihuang Xia, "Research on coolingand sealing of blast furnace distributor", Metallurgical equipment, 05, Oct. 15, 2014, 46-48.

Enhua Tian and Bingqian Li, "Patent analysis of sealing technology for fabric feeding devices without bell furnaces", Henan Science and Technology, 22, Nov. 25, 2017, 60-62.

Binqi Liu, "Development of HG fabricer", Ironmaking, 02, Apr. 12, 2013, 67-69.

Jianjun Han, et al., "Baogang BGtype distributor replacing conventional gearbox distributor", Baotou Steel Technology, 04, Aug. 15, 2009, 19-22.

Office Action of Corresponding CN application 202011445810.X, published on Aug. 7, 2024.

Notice of Grant of Patent Right of corresponding CN Application 202011445810.X, published on Sep. 19, 2024.

The grant claims of corresponding CN application 202011445810. X.

* cited by examiner

Part A

Part B

BLAST FURNACE DISTRIBUTING DEVICE WITH NITROGEN SEALING STRUCTURE

TECHNICAL FIELD

The invention belongs to the technical field of blast furnace and relates to an improved blast furnace distributing device with a nitrogen sealing structure.

BACKGROUND

It has been nearly 50 years since the blast furnace has adopted the bell-less top distributor, and has developed a variety of transmission structures such as the most traditional distributor from PW company, Luxembourg called "water-cooled gearbox" or "airtight box", and other different characteristic distributors from CISDI, China, BERIS, China, WISDRI, China and Qinye, China. The common feature of these distributors is that they all have a rotating cylinder structure, and the sealing between the rotating cylinder and the fixed part of the distributor is nitrogen sealing. There are two types of water-cooling structure: open and closed. The closed water-cooling is also called "closed water circulation system" or "pressurized water-cooling system". No matter what kind of water circulation system is used, the common method for the corresponding nitrogen sealing structure is to leave a certain gap at the junction of the rotating cylinder and the distributor shell, and to carry out the nitrogen sealing by passing nitrogen gas whose concentration is higher than that of the inner cavity of the blast furnace into the distributor shell. The inner cavity of the blast furnace is a high-temperature, high-pressure dust environment where the pressure instability often occurs in the furnace, so dust and gas invade the inner cavity of the distributor easily through the gap.

In "Research on Water-cooled Distribution Chute Transmission Gear Box on Bellless Top of Blast Furnace" (Master's Thesis of Northeastern University, China), traditional air sealing structures are well summarized and described. This structure can only adopt a labyrinth structure with a large gap at the junction of the rotating cylinder and the fixed shell. If the gap is reduced, the contact surfaces must be processed with high precision, and jamming will occur due to thermal deformation during operation. However, the large gap will cause that the inner cavity of blast furnace and the inner cavity of the distributor are macroscopically connected, which is easy to blow gas to each other. In order to protect the parts of the inner cavity of the distributor from the high-temperature gas erosion of the inner cavity of the blast furnace, a large amount of nitrogen must be provided to fill the inner cavity of the distributor. It is pointed out that the gas consumption of this kind of air sealing structure is usually thousands of cubic meters per hour. This article also pointed out an improved air sealing method: a graphite block is placed at the junction of the rotating cylinder and the fixed shell, and a pressing ring is set above it. As shown in figures, the graphite block rotates with the rotating cylinder and the pressing ring, and the graphite block is bonded to the fixed joint surface through the plane. The processing requirements for the size of the relevant mating surface are relatively high, and the gap will gradually increase with wear and tear; the lower part of the graphite block directly faces the blast furnace gas and dust; once there is a pressure fluctuation that causes the pressure in the inner cavity of the distributor to be unstable, the blast furnace gas can easily break through the gap and carry the dust to wash and wear the graphite block.

This structure has a better effect in the initial stage, but the long-term effect may gradually deteriorate.

Patent CN201120161414.4 and CN201220013144.7 both use a narrow gap labyrinth at the junction of the rotating cylinder and the fixed shell to increase the blast furnace gas resistance loss, but there is still a risk of leakage in theory. Patent CN200820077191.1 adopts a wear-resistant sealing ring structure (similar to a floating ring) which is similar to the above-mentioned structure in "Research on Water-cooled Distribution Chute Transmission Gear Box on Bellless Top of Blast Furnace", and adds elastic elements to make the wear-resistant sealing ring always in contact with the opposite joint surface, thereby overcoming the defects of the floating ring structure in "Research on Water-cooled Distribution Chute Transmission Gear Box on Bellless Top of Blast Furnace". However, the elastic element is a vulnerable part. Once the entire distributor is damaged and it needs to be disassembled and replaced, maintenance is much difficult. The contact between the first annular part and the second annular part described in Patent CN201580027776.5 can theoretically improve the sealing effect. Since the first annular part and the second annular part are respectively fixedly connected with the fixed shell and the rotating part, it is similar to the narrowed version of the gap in the traditional way (and pushed to the limit as a contact state). As mentioned above, such a structure requires very high machining accuracy, and high temperature deformation during operation is unavoidable.

INVENTION CONTENT

In view of this, the object of the present invention is to provide a improved blast furnace distributing device with a nitrogen sealing structure. On the basis of reducing manufacturing difficulty, the nitrogen sealing structure can float to realize self-adaptive sealing during operation, which not only prolongs its service life, but also reduces the nitrogen consumption effect of the distributor.

To achieve the above purpose, the present invention provides the following technical solution:

An improved blast furnace distributing device with a nitrogen sealing structure, which includes a fixed shell, a rotating cylinder, and a central throat; the rotating cylinder is installed above interior of the fixed shell through slewing bearing and driven by the slewing bearing to rotate around center of rotation, and upper part of the central throat is fixedly connected with central ring hole above the fixed shell; the rotating cylinder is mainly composed of an inner cylinder, a cylinder bottom plate and an outer cylinder, wherein the cylinder bottom plate is an annular disc, the inner cylinder is arranged on upper end surface of the cylinder bottom plate and is located on the inner side of the cylinder bottom plate, and the outer cylinder is arranged on lower end surface of the cylinder bottom plate and is located on the outer side of the cylinder bottom plate; an intermediate fixed cylinder is detachably installed at annular gap formed between the central throat and the inner cylinder of the rotating cylinder;

an annular air chamber I is formed between the inner cylinder and the intermediate fixed cylinder, outer peripheral surface of the intermediate fixed cylinder is provided with a shaft shoulder I, there is an annular gap I between outer peripheral surface of the shaft shoulder I and the inner cylinder; the shaft shoulder I is used as an intermediate spacer ring to divide the annular air chamber I into upper air chamber I and lower air chamber I, and the upper air chamber I and the lower air chamber I are connected through the annular gap I; middle lower floating ring is set above the shaft shoulder I of the intermediate fixed cylinder, and middle upper floating ring rests freely on the middle lower floating ring; there is a lower mating surface I on the middle lower floating ring, and upper mating surface I that matches the lower mating surface I is correspondingly provided on the middle upper floating ring; at least one of the upper mating surface I and the lower mating surface I is a convex annular curved surface, so that the upper mating surface I and lower mating surfaces I form a line contact;

there is a middle labyrinth ring in the lower air chamber I below the shaft shoulder I;

there is a fixed short pipe under the fixed shell, and an annular air chamber II is formed between the outer cylinder placed in the fixed short pipe and the fixed short pipe;

there is a shaft shoulder II on outer peripheral surface of the outer cylinder, and there is an annular gap II between outer peripheral surface of the shaft shoulder II and the fixed short pipe; the shaft shoulder II as an outer ring spacer divides the annular air chamber II into upper air chamber II and lower air chamber II, and the upper air chamber II and the lower air chamber II are connected through the annular gap II;

lower floating ring of outer ring is set above the shaft shoulder II of the outer cylinder, and upper floating ring of outer ring rests freely on the lower floating ring of the outer ring; the lower floating ring of the outer ring is provided with a lower mating surface II on it, and the upper floating ring of the outer ring is correspondingly provided with an upper mating surface II on it matching the lower mating surface II; at least one of the upper matching surface II and the lower matching surface II is a convex annular curved surface, so that the upper matching surface II and lower matching surfaces II form a line contact;

there is an outer labyrinth ring arranged in the lower air chamber II below the shaft shoulder II.

Further, the intermediate fixed cylinder is fixed on the slewing bearing or the central throat or the fixed shell through a connector.

Further, in the annular air chamber I, ring width of the upper air chamber I is greater than that of the lower chamber I, and ring width of the lower chamber I is greater than that of the annular gap I; in the annular air chamber II, ring width of the upper air chamber II is greater than that of the lower air chamber II, and ring width of the lower air chamber II is greater than that of the annular gap II.

Further, the upper mating surface I and the lower mating surface I are both convex annular curved surfaces, or one of the upper mating surface I and the lower mating surface I is a slope which matches the convex annular curved surface, or one of the upper mating surface I and the lower mating surface I is an concave annular surface which matches an outer convex annular surface;

the upper mating surface II and the lower mating surface II are both convex annular curved surfaces, or one of the upper mating surface II and the lower mating surface II is a slope which matches the convex annular curved surface, or one of the upper mating surface II and the lower mating surface II is an concave annular surface which matches an outer convex annular surface.

Further, when the convex annular curved surface is matched with the concave annular curved surface, the curvature radius of the concave annular curved surface is greater than that of the convex annular curved surface.

Further, the upper mating surface I and the lower mating surface I, the upper mating surface II and the lower mating surface II are provided with wear-resistant materials on it.

Further, the middle upper floating ring, the middle lower floating ring, the upper floating ring of the outer ring and the lower floating ring of the outer ring are made of graphite or ceramic material.

Further, air supply pipe of intermediate air chamber which blows and presses the middle upper floating ring is connected to the annular air chamber I.

Further, there is a gap between the fixed short pipe and the cylinder bottom plate, so that the upper air chamber II in the annular air chamber II connects with inner cavity of distributor; the inner cavity of the distributor connects to an air supply pipe of the inner cavity of the distributor.

Further, the middle labyrinth ring and the outer labyrinth ring are both composed of bellows arranged in pairs.

The beneficial effects of the present invention are:

1. The nitrogen sealing structure in this application increases the number of labyrinths at the inner cavity end of the blast furnace, which enhances the effect of dust reduction and damage resistance and forms the first barrier for the sealing of the inner cavity of the distributor; at the same time, the elasticity of the corrugated structure is also convenient for installing.

2. The upper and lower floating ring line contact structure is adopted, so that it has an adaptive function. The contact position is always in contact, and through working break-in, the contact position is better combined, which further enhances the sealing effect, and reduces the processing difficulty. Also, when the line contact structure is in operation, it is not easy to cause jamming due to dimensional errors.

3. The mating surface of the floating ring is made of wear-resistant material, which further prolongs the service life of the upper and lower floating rings.

4. The upper and lower floating rings cooperate with the inclined surface and the concave arc surface through the convex annular surface, so that the contact surface is in oblique contact, thereby reducing the normal force at the contact position, and has an automatic centering effect, further reducing friction and prolonging the service life of floating ring.

5. The floating ring with split structures is convenient for partial installation and disassembly, and can be disassembled without dismantling too many structures, which is convenient for equipment maintenance.

Other advantages, objectives and features of the present invention will be illustrated in the following description to some extent, and will be apparent to those skilled in the art based on the following investigation and research to some extent, or can be taught from the practice of the present invention. The objectives and other advantages of the present invention can be realized and obtained through the following description.

DESCRIPTION OF DRAWINGS

To enable the purpose, the technical solution and the advantages of the present invention to be more clear, the present invention will be preferably described in detail below in combination with the drawings, wherein.

In the figures.

Figure 1:
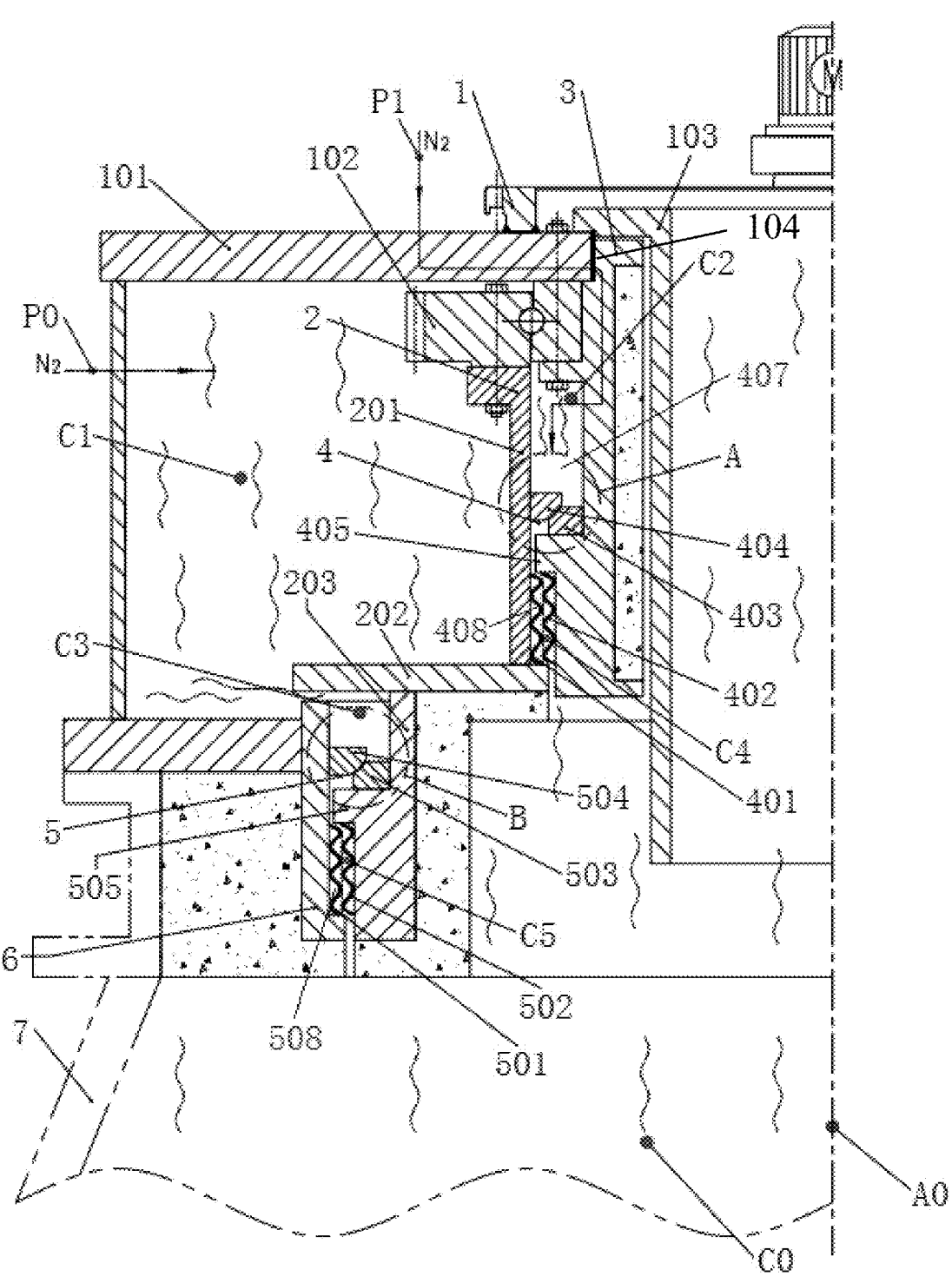
FIG. 1 is the structural schematic diagram of the invention.

C0—inner cavity of blast furnace; C1—inner cavity of distributor; C2—annular air chamber I; C3—annular air chamber II; C4—serpentine channel; C5—serpentine channel; S0—lower mating surface I; S1—upper mating surface I; S3—lower mating surface II; S4—upper mating surface II; P0—air supply pipe of inner cavity of distributor; P1—air supply pipe of intermediate air chamber; A0—central axis of blast furnace; 1—distributor; 2—rotating cylinder; 3—intermediate fixed cylinder; 4—sealing structure I; 5—sealing structure II; 6—fixed short pipe; 7—blast furnace; 101—fixed shell; 102—slewing bearing; 103—central throat; 104—central ring hole; 201—inner cylinder; 202—cylinder bottom plate; 203—outer cylinder; A—sealing structure I; B—Sealing structure II;

in the sealing structure I: 401—middle labyrinth ring; 402—middle labyrinth ring; 403—middle lower floating ring; 404—middle upper floating ring; 405—shaft shoulder I; 406—annular gap I; 407—upper air chamber I; 408—lower air box I; 409—wear-resistant layer of lower floating ring; 410—wear-resistant layer of upper floating ring;

in the sealing structure II: 501—outer labyrinth ring; 502—outer labyrinth ring; 503—lower floating ring of outer ring; 504—upper floating ring of outer ring; 505—shaft shoulder II; 506—annular gap II, 507—upper air chamber II; 508—lower air chamber II.

DETAILED DESCRIPTION

Embodiments of the present invention are described below through specific embodiments. Those skilled in the art can understand other advantages and effects of the present invention easily through the disclosure of the description. The present invention can also be implemented or applied through additional different specific embodiments. All details in the description can be modified or changed based on different perspectives and applications without departing from the spirit of the present invention. It should be noted that the figures provided in the following embodiments only exemplarily explain the basic conception of the present invention, and if there is no conflict, the following embodiments and the features in the embodiments can be mutually combined.

Same or similar reference numerals in the drawings of the embodiments of the present invention refer to same or similar components. It should be understood in the description of the present invention that terms such as "upper", "lower", "left", "right", "front" and "back" indicate direction or position relationships shown based on the drawings, and are only intended to facilitate the description of the present invention and the simplification of the description rather than to indicate or imply that the indicated device or element must have a specific direction or constructed and operated in a specific direction, and therefore, the terms describing position relationships in the drawings are only used for exemplary description and shall not be understood as a limitation to the present invention; for those ordinary skilled in the art, the meanings of the above terms may be understood according to specific conditions.

As shown in FIG. 1, the invention is a blast furnace distributor with an improved nitrogen sealing structure. The first thing to be explained is that the distributor body 1 and its transmission structure are existing conventional structures. The water-cooling technology (including "closed water circulation system" and "open water circulation system") applicable to the distributor body 1 is also a well-known technical method, so it is not described in detail in this application. Secondly, it needs to be explained that the improving method of the nitrogen sealing structure in this invention can be applied to the above-mentioned existing blast furnace distributors.

The improving method of the nitrogen sealing structure will be described in detail in conjunction with the accompanying drawings below:

The improved blast furnace distributing device with a nitrogen sealing structure includes a fixed shell (101), a rotating cylinder (2), and a central throat (103); the rotating cylinder (2) is installed above interior of the fixed shell (101) through slewing bearing (102) and driven by the slewing bearing (102) to rotate around center of rotation (the center of rotation is also the center of the blast furnace), and upper part of the central throat (103) is fixedly connected with central ring hole (104) above the fixed shell (101); the rotating cylinder (2) is mainly composed of an inner cylinder (201), a cylinder bottom plate (202) and an outer cylinder (203), wherein the cylinder bottom plate (202) is an annular disc, the inner cylinder (201) is arranged on upper end surface of the cylinder bottom plate (202) and is located on the inner side of the cylinder bottom plate (202), and the outer cylinder (203) is arranged on lower end surface of the cylinder bottom plate (202) and is located on the outer side of the cylinder bottom plate (202); the inner side refers to the side of the cylinder bottom plate (202) which closes to the central throat (103); oppositely, the outer side of the cylinder bottom plate (202) is away from the central throat (103).

In the invention, the same sealing structure is used in the area corresponding to the inner cylinder (201) of the rotating cylinder (2) and the area section corresponding to the outer cylinder (203), which is the main improvement point of this invention. The area designated as A and B in FIG. 1 correspond to the detailed sealing structures shown in FIG. 2 and FIG. 3, respectively.

In the section corresponding to the inner cylinder (201) of the rotating cylinder (2), an intermediate fixed cylinder (3) is detachably installed at annular gap formed between the central throat (103) and the inner cylinder (201) of the rotating cylinder (2). The intermediate fixed cylinder (3) is an independently installed part. Since the inner ring of the slewing bearing (102), the central throat (103) and the fixed shell (101) are all fixed parts, they can be fixed on the inner ring of the slewing bearing (102) or the central throat (103) or the fixed shell (101) though a connector (flange, bolt, etc.), it forms an integral body with these parts, which is convenient for not only processing and installation but also the replacement and maintenance of wearing parts.

An annular air chamber I (C2) is formed between the inner cylinder (201) and the intermediate fixed cylinder (3), outer peripheral surface of the intermediate fixed cylinder (3) is provided with a shaft shoulder I (405), there is an annular gap I (406) between outer peripheral surface of the shaft shoulder I (405) and the inner cylinder (201); the shaft shoulder I (405) is used as an intermediate spacer ring to divide the annular air chamber I (C2) into upper air chamber I (407) and lower air chamber I (408), and the upper air chamber I (407) and the lower air chamber I (408) are connected through the annular gap I (406).

Middle lower floating ring (403) is set above the shaft shoulder I (405) of the intermediate fixed cylinder (3), and middle upper floating ring (404) rests freely on the middle lower floating ring (403); there is a lower mating surface I (S0) on the middle lower floating ring (403), and upper mating surface I (S1) that matches the lower mating surface I (S0) is correspondingly provided on the middle upper floating ring; at least one of the upper mating surface I (S1) and the lower mating surface I (S0) is a convex annular curved surface, so that the upper mating surface I (S1) and lower mating surfaces I (S0) form a line contact; there is a middle labyrinth ring (401 and 402) in the lower air chamber I (408) below the shaft shoulder I (405).

Both the middle lower floating ring (403) and the middle upper floating ring (404) have degrees of freedom of axial and circumferential movement; this ensures that they can adapt to manufacturing errors during their movement and find their best working position adaptively.

The shaft shoulder I (405), the middle lower floating ring (403), the middle upper floating ring (404) and the middle labyrinth rings (401 and 402) together constitute the sealing structure I (4) of the corresponding area section of the inner cylinder (201). The shaft shoulder I (405) as the intermediate spacer is a structure that is firmly connected with the intermediate fixed cylinder (3). The diameter of the shaft shoulder I (405) is larger than that of the intermediate fixed cylinder (3). The shaft shoulder I (405) can be welded on the intermediate fixed cylinder (3), or it can be directly designed as an integral body with the intermediate fixed cylinder (3). That is, the excess part is removed by machining, so that the intermediate fixed cylinder (3) forms a radially outwardly protruding ladder structure and divides the annular air chamber I (C2) into upper part and lower part. The middle labyrinth ring (401) is welded on the lower part of the inner cylinder (201) of the rotating cylinder (2), and the middle labyrinth ring (402) is welded on the lower part of the intermediate fixed cylinder (3). The middle labyrinth ring (401) and the middle labyrinth ring (402) are composed of bellows arranged in pairs which have the same cross-sectional shape but different size, and the crests and troughs of the corrugated shape are in one-to-one correspondence. The minimum inner diameter (trough position) of the middle labyrinth ring (401) is slightly smaller than the maximum outer diameter (crest position) of the middle labyrinth ring (402), so that the corrugated tooth structure of the labyrinth ring has an interlocking structure, which not only has the effect of enhancing dust reduction and increasing gas resistance; at the same time, it can also use the elasticity of the corrugation to achieve installation (when installing, it is fixed at the position of the peak and valley of the corrugation to make it rebound); there will be no interference during operation, and the two corresponding bellows form a serpentine channel (C4) during operation.

Figure 2:
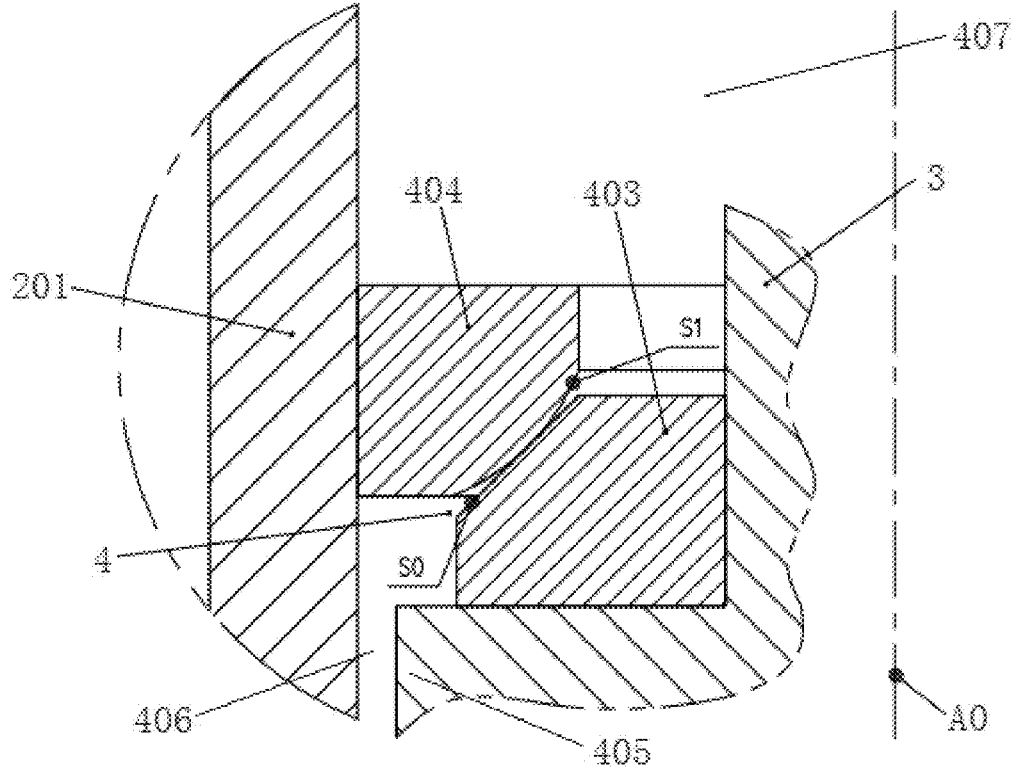
FIG. 2 is an enlarged view of part A of FIG. 1.

The middle lower floating ring (403) is sleeved on the outer cylindrical surface of the intermediate fixed cylinder (3) and has clearance fit. The axial limit of the middle lower floating ring (403) is realized by the upper surface of the shaft shoulder I (405). The lower surface of the middle lower floating ring (403) and the upper surface of the shaft shoulder I (405) are flat and free to contact. As shown in FIG. 2, the upper left corner of the middle lower floating ring (403) is the lower mating surface I (S0) which can be set as a tapered annular surface with a slope in cross section, and the lower right corner of the middle upper floating ring (404)

is the upper mating surface I (S1) which can be set as a circular surface with a convex arc in cross section; the middle upper floating ring (404) is supported by the lower floating ring contact surface (S0) to limit its axial movement; the outer cylindrical surface of the middle upper floating ring (404) and the inner cylindrical surface of the inner cylinder (201) is a clearance fit.

Similarly, a fixed short pipe (6) is provided under the fixed shell (101), and an annular air chamber II (C3) is formed between the outer cylinder (203) placed in the fixed short pipe (6) and the fixed short pipe (6).

There is a shaft shoulder II (505) on outer peripheral surface of the outer cylinder (203), and there is an annular gap II (506) between outer peripheral surface of the shaft shoulder II (505) and the fixed short pipe (6); the shaft shoulder II (505) as an outer ring spacer divides the annular air chamber II (C3) into upper air chamber II (507) and lower air chamber II (508), and the upper air chamber II (507) and the lower air chamber II (508) are connected through the annular gap II (506).

Lower floating ring of outer ring (503) is set above the shaft shoulder II (505) of the outer cylinder (203), and upper floating ring of outer ring (504) rests freely on the lower floating ring of the outer ring (503); the lower floating ring of the outer ring (503) is provided with a lower mating surface II (S3) on it, and the upper floating ring of the outer ring (504) is correspondingly provided with an upper mating surface II (S4) on it matching the lower mating surface II (S3); at least one of the upper matching surface II (S4) and the lower matching surface II (S3) is a convex annular curved surface, so that the upper matching surface II (S4) and lower matching surfaces II (S3) form a line contact. There is an outer labyrinth ring (501 and 502) arranged in the lower air chamber II (508) below the shaft shoulder II (505).

Figure 3:
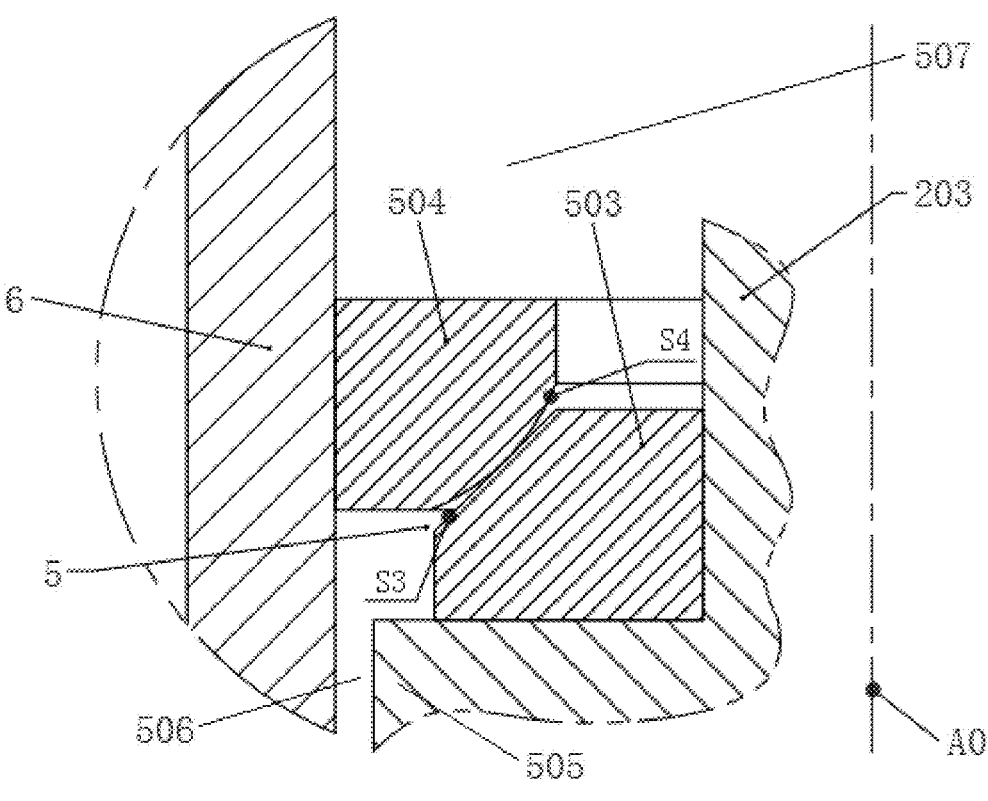
FIG. 3 is an enlarged view of part B of FIG. 1.

The sealing structure II (5) at the area section corresponding to the outer cylinder (203) is the same as the sealing structure I (4), which is composed of the shaft shoulder II (505), the lower floating ring of the outer ring (503), the upper floating ring of the outer ring (504) and the outer labyrinth ring (501 and 502). The fixed short pipe (6) is welded at the lower flange position of the fixed shell (101), and the outer cylinder (203) of the rotating cylinder (2) is welded or bolted to the lower surface of the cylinder bottom plate (202); the shaft shoulder II (505) as the spacer of the outer ring is a structure that is firmly connected with the outer cylinder (203), its diameter is bigger than that of the outer cylinder (203), and it can be welded or integrated with the outer cylinder (203). In this way, the outer cylinder (203) forms a radially outwardly protruding stepped structure and divides the annular air chamber II (C3) into upper part and lower part; as shown in FIG. 1 and FIG. 3, the rest of the sealing structure II (5) is similar to the sealing structure I (4), and it will not repeat them here.

Preferably, in the annular air chamber I (C2), ring width of the upper air chamber I (407) is greater than that of the lower chamber I (408), and ring width of the lower chamber I (408) is greater than that of the annular gap I (406); in the annular air chamber II (C3), ring width of the upper air chamber II (507) is greater than that of the lower air chamber II (508), and ring width of the lower air chamber II (508) is greater than that of the annular gap II (506).

The two mating floating rings have several structural types. For the middle lower floating ring (403) and the middle upper floating ring (404), the upper mating surface I (S1) and the lower mating surface I (S0) are both convex annular curved surfaces; or one of the upper mating surface I (S1) and the lower mating surface I (S0) is a slope (a tapered annular surface) which matches the convex annular curved surface, or one of the upper mating surface I (S1) and the lower mating surface I (S0) is an concave annular surface which matches an outer convex annular surface. For the lower floating ring of the outer ring (503) and the upper floating ring of the outer ring (504), the above situations are also included, that is, the upper mating surface II (S4) and the lower mating surface II (S3) are both convex annular curved surfaces, or one of the upper mating surface II (S4) and the lower mating surface II (S3) is a slope which matches the convex annular curved surface, or one of the upper mating surface II (S4) and the lower mating surface II (S3) is an concave annular surface which matches an outer convex annular surface. It should be noted that when the convex annular curved surface is matched with the concave annular curved surface, the curvature radius of the concave annular curved surface is greater than that of the convex annular curved surface, so as to achieve line contact.

As a further optimization of the above embodiments, the upper mating surface I (S1) and the lower mating surface I (S0), the upper mating surface II (S4) and the lower mating surface II (S3) are provided with wear-resistant materials on it. The mutual contact surfaces of the floating rings are set with wear-resistant materials, or wear-resistant layers are embedded on the partial area of ring surfaces of the contact surfaces, or wear-resistant material is used for the whole or part of the floating rings, which can greatly extend the service life of the floating rings. The graphite material specially proposed here is a preferred solution. Other materials such as ceramic materials are also allowed. In terms of material selection, in addition to the convenience of manufacturing and processing, the material should also have the characteristics of high temperature resistance and small thermal deformation.

Figure 4:
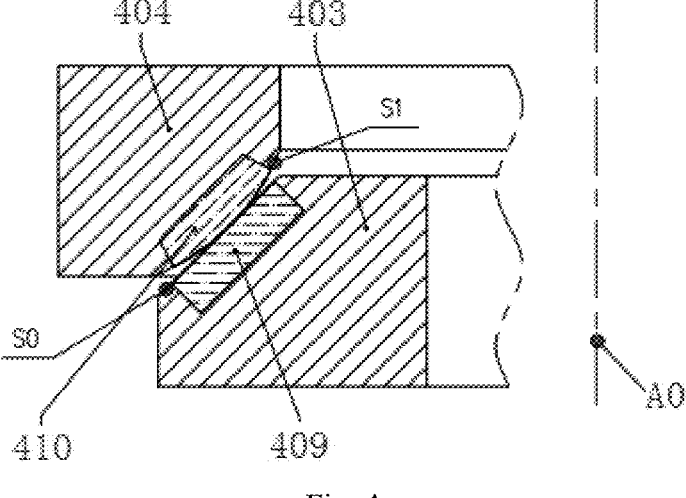
FIG. 4 is a schematic diagram of a floating ring structure.

What is shown in FIG. 4 is a kind of floating ring structure. The wear-resistant layer of the lower floating ring (409) is embedded near the upper contact line of the lower mating surface I (S0) of the middle lower floating ring (403). The wear-resistant layer of the lower floating ring (409) can be formed by machining an annular groove on the lower mating surface I (S0) and then surfacing hard alloy. Similarly, the wear-resistant layer of the upper floating ring (410) can be formed by machining an annular groove on the upper mating surface I (S1) of the middle upper floating ring (404) and then surfacing hard alloy.

In this application, the characteristics of graphite including high temperature resistance, wear resistance, self-lubrication and easy processing can be fully utilized. Ceramic material is also an excellent candidate material, and the brittle characteristics of ceramics need to be considered. With the development of material technology in the future, other materials that meet high temperature resistance and wear resistance can also be used as alternative materials for the upper floating ring and lower floating ring.

The blast furnace distributor is also equipped with other equipment, wherein the fixed shell (101) of the distributor (1) is provided with a air supply pipe of the inner cavity of the distributor (P0) communicated with the inner cavity of the distributor (C1), there is a narrow gap between the lower surface of the cylinder bottom plate (202) and the upper end surface of the fixed short pipe (6), and the inner cavity of the distributor (C1) communicates with the upper air chamber II (507) of the annular air chamber II (C3) through the gap. At the same time, another air supply pipe, the air supply pipe of intermediate air chamber (P1), is provided on the fixed shell (101) of the distributor (1). The upper plate of the fixed shell (101) and the intermediate fixed cylinder (3) have an air channel and communicate with each other. The outer end of the air channel communicates with the air supply pipe of the intermediate air chamber (P1), and the inner end communicates with the upper air chamber I (407) of the annular air chamber I (C2), realizing that the air supply pipe of the intermediate air chamber (P1) is connected to the annular air chamber I (C2), so that the middle upper floating ring (404) can be blown.

Figure 5A:
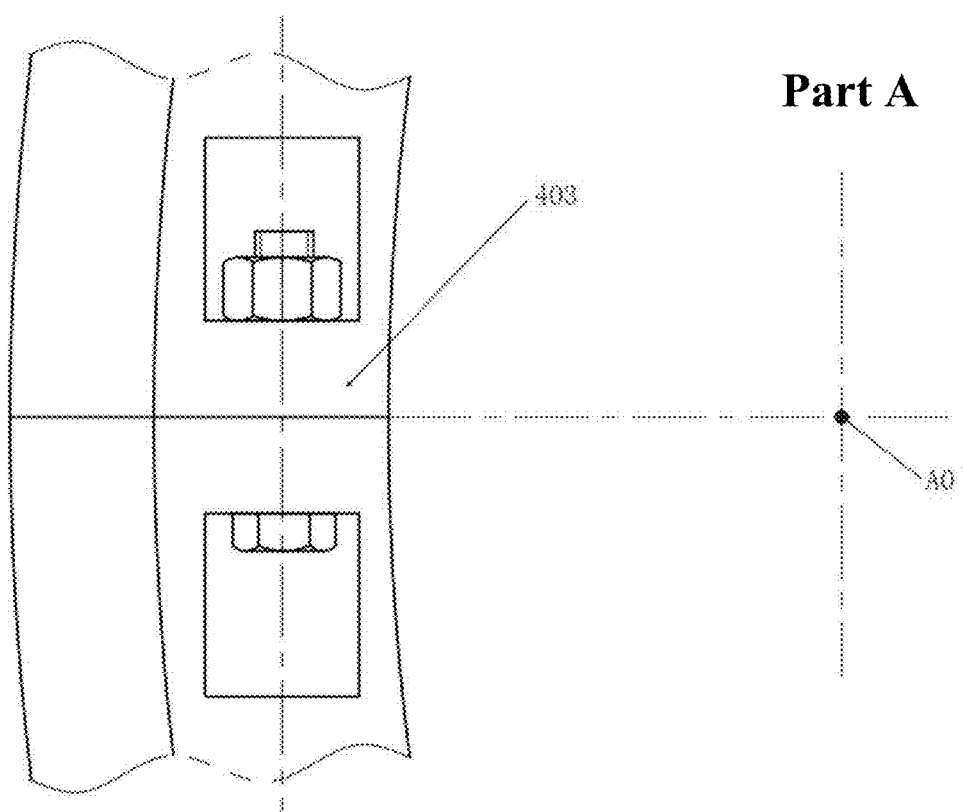
FIG. 5*a* is a schematic diagram of the split structure of the floating ring in sealing structure I.
Figure 5B:
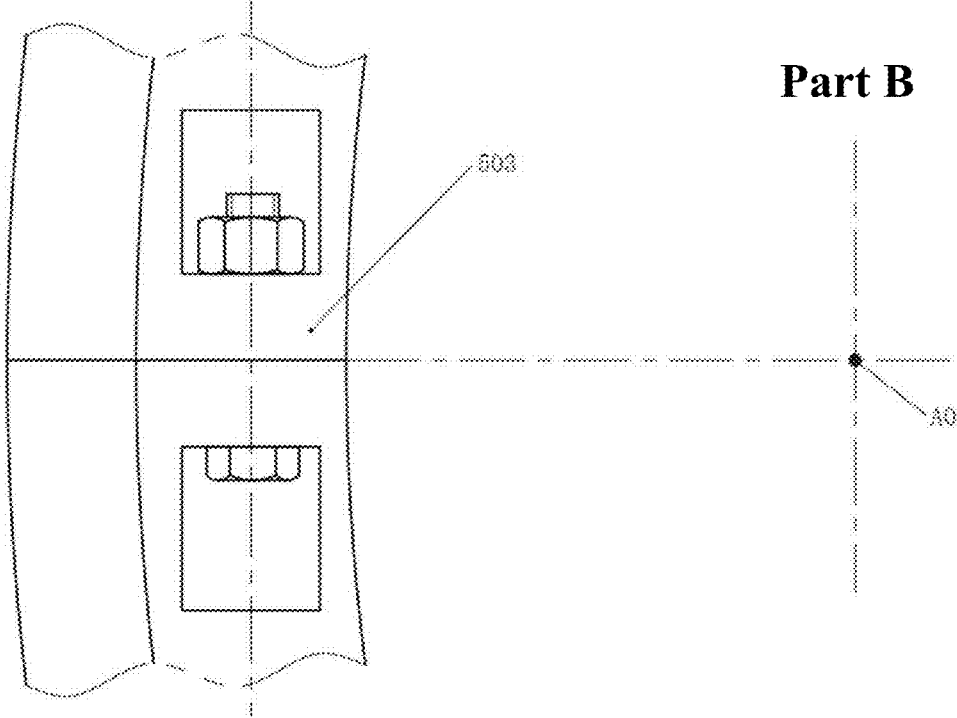
FIG. 5*b* is a schematic diagram of the split structure of the floating ring in sealing structure II.

For the convenience of assembly and disassembly, as an optimization, the middle upper floating ring (404), the middle lower floating ring (403), the upper floating ring of the outer ring (504), and the lower floating ring of the outer ring (503) can be in a split structure as shown in FIG. 5. That is, the floating ring is split into two halves in the diameter direction which is connected by bolts and (or) positioning pins during operation and is disconnected by operating local bolts and (or) positioning pins during disassembly. The installation of the connector can be realized by digging out a local groove structure which is big enough for bolt and (or) pin connection on the upper or lower surface of the floating ring.

As an optimization, it is also feasible to install lubricants on the mating surfaces (S0, S1, S3, S4) of each floating ring, and the lubricant supply channels can adopt a structure similar to that of the air channels (P0, P1) to respectively deliver the lubricant to the positions of the upper and lower floating ring mating surfaces in the annular air chamber (C2, C3).

The specific implementation of adopting the nitrogen sealing structure of the present embodiment is described in detail below:

1. The sealing structure I (4) is set at the annular air chamber I (C2), and is divided into upper part and lower part by the shaft shoulder I (405), wherein the upper air chamber I (407) is equipped with the wear-resistant layer of the lower floating ring (409) and the wear-resistant layer of the upper floating ring (410), and the lower air chamber I (408) is partly installed the middle labyrinth ring (401); the sealing structure II (5) is set at the position of the annular air chamber II (C3) whose specific structure is similar to the sealing structure I (4).

2. When the distributor is working, the annular air chamber I (C2) and the annular air chamber II (C3) are fed with nitrogen from the air supply pipe of intermediate air chamber (P1) and the air supply pipe of the inner cavity of the distributor (P0) respectively, and the nitrogen pressure is kept higher than the inner pressure of the blast furnace.

3. In the early stage of the distributor, the rotating cylinder will rotate, and the middle upper floating ring (404) and/or the lower floating ring of the outer ring (503) may rotate together with the rotating cylinder. Due to the processing size error, the circumferential jam may occur after rotating to a certain position, so that the floating ring is in a relatively fixed position in the circumferential direction. At this time, the motion is realized by sliding relatively to the upper mating surface of the middle lower floating ring (403) and the upper floating ring of the outer ring (504) can freely float in the axial direction, they will never cause jamming. Due to the nitrogen pressure and gravity, the upper and lower floating rings always keep in contact.

4. If the machining dimensional accuracy and concentricity of the outer cylindrical surface of the middle upper floating ring (404) and the upper floating ring of the outer ring (504) and the opposite wall surface (the inner wall surface of the inner cylinder (201) and the inner wall surface of the fixed short pipe (6)) are very good, so that It has a small fit gap (preferably the fit gap is always maintained), so that the upper and lower floating rings will not have sliding wear during work, and will be relatively stationary on the rotating cylinder or spacer ring, and the gap can greatly improve nitrogen sealing effect and reduce nitrogen consumption.

5. If the upper and lower floating rings in sealing structure I (4) and sealing structure II (5) operate according to the above 3., with the work of the distributor, the mating surfaces of the upper and lower floating rings will run into each other to achieve a tighter fit, and the mating surface gets smoother through mutual running-in.

6. If the upper and lower floating rings in sealing structure I (4) and sealing structure II (5) operate according to the above 4., it is possible that the floating rings will be blocked in the circumferential direction due to long-term thermal deformation. At this time, the upper and lower floating rings will automatically operate according to the method described in 3. above and then develop to the method described in 5.

7. When working, when dust and air pressure in the inner cavity of the blast furnace (C0) pass to the annular air chamber I (C2) and the annular air chamber II (C3), the dust can be stopped and the air pressure can be reduced through the labyrinth structure.

8. When the air pressure of the blast furnace (7) suddenly rises due to abnormal conditions, it is possible to jack up the middle upper floating ring (404) and the upper floating ring on the outer ring (504). The middle upper floating ring (404) and the upper floating ring on the outer ring (504) can quickly fall back to its original position due to gravity.

In general, the nitrogen sealing structure is divided into two functional areas in the overall structure, among which the labyrinth structure near the lower side of the blast furnace can not only play the role of dust prevention and dust reduction, but also increase the gas pressure resistance loss in the furnace, which provide favorable conditions for the sealing of the upper floating ring; a matching floating ring is set on the upper side of the distributor, they can always keep in contact through self-adaptation during operation, and can achieve a tighter combination through mutual running-in, and such a structure does not require high-precision manufacturing costs; by keeping the upper pressure higher than the blast furnace pressure, the floating ring can be guaranteed to have a certain sealing force to achieve a better sealing effect. The floating ring structure and the labyrinth structure protect each other. The floating ring sealing has less leakage which reduces the blow-by of the blast furnace cavity and the distributor cavity, thereby reducing the wear of the gas on the labyrinth, and the labyrinth structure can reduce dust and pressure as front protection for the floating ring sealing.

The above descriptions are only examples of the invention, and are not used to limit the protection scope of the invention. For those skilled in the art, the application can have various modifications and changes. Any modification, equivalent replacement, improvement, etc. made within the spirit and principle of this invention shall be included in the protection scope of this invention.

The invention claimed is:

1. An improved blast furnace distributing device with a nitrogen sealing structure, comprising a fixed shell, a rotating cylinder, and a central throat; the rotating cylinder is installed above an interior of the fixed shell through a slewing bearing and driven by the slewing bearing to rotate around a center of rotation, and an upper part of the central throat is fixedly connected with a central ring hole above the fixed shell; the rotating cylinder is mainly composed of an inner cylinder, a cylinder bottom plate and an outer cylinder, wherein the cylinder bottom plate is an annular disc, the inner cylinder is arranged on an upper end surface of the cylinder bottom plate and is located on an inner side of the cylinder bottom plate, and the outer cylinder is arranged on a lower end surface of the cylinder bottom plate and is located on an outer side of the cylinder bottom plate; an intermediate fixed cylinder is detachably installed at an annular gap formed between the central throat and an inner cylinder of the rotating cylinder; an annular air chamber I is formed between the inner cylinder and the intermediate fixed cylinder; an outer peripheral surface of the intermediate fixed cylinder is provided with a shaft shoulder I; an annular gap I is provided between an outer peripheral surface of the shaft shoulder I and the inner cylinder; the shaft shoulder I is used as an intermediate spacer ring to divide the annular air chamber I into an upper air chamber I and a lower air chamber I, and the upper air chamber I and the lower air chamber I are connected through the annular gap I; a middle lower floating ring is set above the shaft shoulder I of the intermediate fixed cylinder, and a middle upper floating ring rests freely on the middle lower floating ring; the middle lower floating ring has a lower mating surface I, and the middle upper floating ring is correspondingly provided with an upper mating surface I configured to match the lower mating surface I; at least one of the upper mating surface I and the lower mating surface I is a convex annular curved surface, so that the upper mating surface I and the lower mating surface I form a line contact; a middle labyrinth ring is disposed within the lower air chamber I below the shaft shoulder I;

a fixed short pipe is provided under the fixed shell, and an annular air chamber II is formed between the outer cylinder placed in the fixed short pipe; a shaft shoulder II is provided on an outer peripheral surface of the outer cylinder, and an annular gap II is provided between an outer peripheral surface of the shaft shoulder II and the fixed short pipe; the shaft shoulder II as an outer ring spacer divides the annular air chamber II into an upper air chamber II and a lower air chamber II, and the upper air chamber II and the lower air chamber II are connected through the annular gap II; a lower floating ring of an outer ring is set above the shaft shoulder II of the outer cylinder, and an upper floating ring of the outer ring rests freely on the lower floating ring of the outer ring; the lower floating ring of the outer ring is provided with a lower mating surface II on it, and the upper floating ring of the outer ring is correspondingly provided with an upper mating surface II on it matching the lower mating surface II; at least one of the upper matching surface II and the lower matching surface II is a convex annular curved surface, so that the upper matching surface II and lower matching surfaces II form a line contact;

an outer labyrinth ring is arranged in the lower air chamber II below the shaft shoulder II.

2. The improved blast furnace distributing device with a nitrogen sealing structure according to claim 1, wherein the intermediate fixed cylinder is fixed on the slewing bearing, the central throat, or the fixed shell through a connector.

3. The improved blast furnace distributing device with a nitrogen sealing structure according to claim 1, wherein in the annular air chamber I, a ring width of the upper air chamber I is greater than that of the lower chamber I, and a ring width of the lower chamber I is greater than that of the annular gap I; in the annular air chamber II, a ring width of the upper air chamber II is greater than that of the lower air chamber II, and a ring width of the lower air chamber II is greater than that of the annular gap II.

4. The improved blast furnace distributing device with a nitrogen sealing structure according to claim 1, wherein:

the upper mating surface I and the lower mating surface I are both convex annular curved surfaces, one of the upper mating surface I and the lower mating surface I is a slope which matches the convex annular curved surface, or one of the upper mating surface I and the lower mating surface I is a concave annular surface which matches an outer convex annular surface; the upper mating surface II and the lower mating surface II are both convex annular curved surfaces, one of the upper mating surface II and the lower mating surface II is a slope which matches the convex annular curved surface, or one of the upper mating surface II and the lower mating surface II is a concave annular surface which matches an outer convex annular surface.

5. The improved blast furnace distributing device with a nitrogen sealing structure according to claim 4, wherein when the convex annular curved surface is matched with the concave annular curved surface, the curvature radius of the concave annular curved surface is greater than that of the convex annular curved surface.

6. The improved blast furnace distributing device with a nitrogen sealing structure according to claim 4, wherein the upper mating surface I, the lower mating surface I, the upper mating surface II, and the lower mating surface II are each provided with a wear-resistant material.

7. The improved blast furnace distributing device with a nitrogen sealing structure according to claim 1, wherein the middle upper floating ring, the middle lower floating ring, the upper floating ring of the outer ring and the lower floating ring of the outer ring are made of graphite or ceramic material.

8. The improved blast furnace distributing device with a nitrogen sealing structure according to claim 1, wherein an air supply pipe of an intermediate air chamber which blows and presses the middle upper floating ring is connected to the annular air chamber I.

9. The improved blast furnace distributing device with a nitrogen sealing structure according to claim 1, wherein a gap is provided between the fixed short pipe and the cylinder bottom plate such that the upper air chamber II in the annular air chamber is in communication with an inner cavity of the distributor; the inner cavity of the distributor connects to an air supply pipe of the inner cavity of the distributor.

10. The improved blast furnace distributing device with a nitrogen sealing structure according to claim 1, wherein the middle labyrinth ring and the outer labyrinth ring are both composed of bellows arranged in pairs.

* * * * *